(12) United States Patent
Leishman

(10) Patent No.: US 7,110,855 B2
(45) Date of Patent: Sep. 19, 2006

(54) ORDER PROCESSING SYSTEM USING PICK AND PASS PROCESS AND METHOD OF PROCESSING ORDERS USING THE SYSTEM

(75) Inventor: LaMar Sutton Leishman, Boutiful, UT (US)

(73) Assignee: SK Daifuku Corporation, Salt Lake City, UT (US)

( * ) Notice: Subject to any disclaimer, the term of this patent is extended or adjusted under 35 U.S.C. 154(b) by 0 days.

(21) Appl. No.: 10/452,552

(22) Filed: May 30, 2003

(65) Prior Publication Data

US 2004/0243278 A1    Dec. 2, 2004

(51) Int. Cl.
*G06F 7/00*    (2006.01)

(52) U.S. Cl. ..................... 700/216; 700/214
(58) Field of Classification Search ................ 700/216, 700/214; 414/273, 268, 800
See application file for complete search history.

(56) References Cited

U.S. PATENT DOCUMENTS

| | | | |
|---|---|---|---|
| 4,542,808 A * | 9/1985 | Lloyd et al. ................... 186/56 |
| 4,561,820 A * | 12/1985 | Matheny et al. ....... 414/331.03 |
| 5,395,206 A * | 3/1995 | Cerny, Jr. ..................... 414/807 |
| 5,582,497 A | 12/1996 | Noguchi |
| 5,636,966 A * | 6/1997 | Lyon et al. .............. 414/791.6 |
| 5,720,157 A * | 2/1998 | Ross ............................. 53/445 |
| 5,875,434 A * | 2/1999 | Matsuoka et al. ............. 705/28 |
| 6,011,998 A * | 1/2000 | Lichti et al. ................. 700/230 |
| 6,061,607 A | 5/2000 | Bradley et al. |
| 6,062,400 A | 5/2000 | Schieler et al. |
| 6,064,921 A * | 5/2000 | Pippin et al. ................ 700/242 |
| 6,129,497 A | 10/2000 | Woodson, III et al. |
| 6,181,979 B1 * | 1/2001 | Murakami ................... 700/216 |
| 6,289,260 B1 | 9/2001 | Bradley et al. |
| 6,377,867 B1 * | 4/2002 | Bradley et al. ............. 700/216 |
| 6,505,093 B1 * | 1/2003 | Thatcher et al. ............ 700/216 |

(Continued)

FOREIGN PATENT DOCUMENTS

DE    19850636    4/2000

(Continued)

*Primary Examiner*—Khoi H. Tran
(74) *Attorney, Agent, or Firm*—Wood, Phillips, Katz, Clark and Mortimer

(57) ABSTRACT

A method of processing orders in a warehouse. The method includes the steps of: providing a first pick module in a first pick zone with a plurality of stored items and a first picking station; providing a second pick module in a second pick zone with a second plurality of stored items and a second picking station; releasing a first order including at least one item from each of the first and second pick modules and thereby causing a) the at least one item in the first module to be retrieved and delivered to the first picking station and b) the at least one item in the second pick module be retrieved and delivered to the second picking station; directing a first tote serially to the first and second pick zones; determining whether the first tote is at the first pick zone and, upon determining that the first tote is at the first pick zone, picking the at least one item from the first picking station and placing the at least one item from the first picking station in the first tote; and determining whether the first tote is at the second pick zone and, upon determining that the first tote is at the second pick zone, picking the at least one item from the second picking station and placing the at least one item from the second picking station in the first tote.

20 Claims, 7 Drawing Sheets

U.S. PATENT DOCUMENTS

| | | | |
|---|---|---|---|
| 6,622,127 B1 * | 9/2003 | Klots et al. | 705/28 |
| 6,711,798 B1 * | 3/2004 | Sanders et al. | 29/407.01 |
| 2002/0021954 A1 | 2/2002 | Winkler | |

FOREIGN PATENT DOCUMENTS

WO     WO 02/083507 A2     10/2002

\* cited by examiner

ORDER PROCESSING SYSTEM USING PICK AND PASS PROCESS AND METHOD OF PROCESSING ORDERS USING THE SYSTEM

BACKGROUND OF THE INVENTION

1. Field of the Invention

This invention relates to order processing in a warehouse and, more particularly, to a system for processing orders using a pick and pass process. The invention is further directed to a method of processing orders using the system.

2. Background Art

Order picking in warehouse operations has been closely scrutinized in recent years. This arises from the increased emphasis on new operating concepts such as just-in-time, quick response, and new marketing strategies. These strategies require that: a) more stock keeping units are available; and b) small orders are delivered with greater frequency and accuracy. The overall goal of such systems is increase in throughput, storage, and accuracy.

While order picking techniques vary greatly, they are generally classified into three main areas: a) pallet picking; b) case picking; and c) piece picking, also referred to as broken case picking.

In broken case picking systems, individual items are picked from stored locations. Piece pick operations generally have large stock keeping unit bases in the thousands, or tens of thousands, of items. These operations typically have small quantities per pick and short cycle times.

Pick and pass order picking, also known as zone picking, is the order picking version of an assembly line. In zone picking, the picking order is broken up into individual pick zones. Order pickers are assigned a specific zone and pick only from within that zone. Orders are assigned to one tote, or multiple totes. After an order is assigned, the tote(s) is inducted and moved from one zone to the next as the picking from the previous zone is completed until all picks for the tote are completed. The operator will then push the tote onto a take-away conveyor when all the items at that zone have been picked.

With pick and pass operations, it is important to balance the number of picks from zone to zone to maintain a consistent flow. Conveyors are used to move totes between zones. Zones are typically sized to accommodate enough picks for one or two order pickers. Additionally, to maintain high production and efficiency, pick zones need to be sized so that the travel time between zones is kept to a minimum.

Historically, flow rack technology has been the industry standard for pick and pass operations. In these systems, shelves are mounted at a slight angle to allow items to be moved by gravity towards a pick location. Items are restocked from the rear of the flow rack and picking is done from the front face. Flow rack technology is useful when there is a high volume of picks per stock keeping unit. Flow rack technology typically is appropriate for medium to fast moving stock keeping units. Slow moving stock keeping units do not generally perform well due to the fact that the picking operator has to walk too far between picks. This problem has long existed and continues to exist.

SUMMARY OF THE INVENTION

In one form, the invention is directed to a method of processing orders in a warehouse. The method includes the steps of: providing a first pick module in a first pick zone with a plurality of stored items and a first picking station; providing a second pick module in a second pick zone with a second plurality of stored items and a second picking station; releasing a first order including at least one item from each of the first and second pick modules and thereby causing a) the at least one item in the first module to be retrieved and delivered to the first picking station and b) the at least one item in the second pick module be retrieved and delivered to the second picking station; directing a first tote serially to the first and second pick zones; determining whether the first tote is at the first pick zone and, upon determining that the first tote is at the first pick zone, picking the at least one item from the first picking station and placing the at least one item from the first picking station in the first tote; and determining whether the first tote is at the second pick zone and, upon determining that the first tote is at the second pick zone, picking the at least one item from the second picking station and placing the at least one item from the second picking station in the first tote.

The step of releasing an order may involve downloading an order for processing at each of the first and second pick modules.

In one form, the step of providing a first pick module involves providing a first pick module with first automated equipment that receives a first processing command in response to the downloading of the first order, and the step of causing the at least one item in the first pick module to be retrieved and delivered to the first picking station involves causing the first automated equipment to retrieve and deliver the at least one item in the first pick module to the first picking station as an incident of receiving the first processing command.

The method may further include the step of releasing a second order including at least another item from the first pick module by downloading the second order for processing at the first pick module and thereby causing the first automated equipment to receive a second processing command and, as an incident thereof, to retrieve and deliver the at least another item in the first pick module to the first picking station. The first automated equipment delivers the at least one item and the at least another item from the first pick module to the first picking station on a first-in-first-out basis.

The method may further include the steps of directing a second tote to the first pick zone, determining whether the second tote is at the first pick zone and, upon determining the second tote is at the second pick zone, picking the at least another item from the first picking station and placing the at least another item from the first picking station in the second tote.

The steps of directing the first and second totes to the first pick zone may involve causing the first and second totes to simultaneously reside at the first pick zone. The steps of placing the at least one item in the first tote and the at least another item in the second tote may involve placing the at least one item and the at least another item in their respective totes in the sequence in which the at least one item and the at least another item are delivered to the first picking station.

The step of providing a second pick module may involve providing a second pick module with second automated equipment that receives a second processing command in response to the downloading of the first order. The step of causing the at least one item in the second pick module to be retrieved and delivered to the second picking station may involve causing the second automated equipment to retrieve and deliver the at least one item in the second pick module to the second picking station as an incident of receiving the second processing command.

The step of directing the first tote to the first and second pick zones may involve directing the first tote on a conveyor having at least one of a) a belt and b) a plurality of rollers, to the first and second pick zones.

The step of directing the first tote to the first and second pick zones may involve directing the first tote from the first pick zone to the second pick zone after the at least one item from the first pick zone is placed in the first tote.

The method may further involve the step of directing the first tote and the second tote from the first zone to the second zone after the at least one item from the first pick zone is placed in the first tote and after the at least another item from the first zone is placed in the second tote.

The method may further include the step of determining the number of totes required for the first order before releasing the first order.

The method may include the step of assigning an identification to each tote in the first order before releasing the first order.

The method may further include the step of assigning a separate operator to each of the first and second zones to manually place the at least one item at the first picking station in the first tote with the first tote at the first pick zone and the at least one item at the second picking station in the first tote with the first tote at the second pick zone.

In one form, the step of providing a first module with first automated equipment involves providing a first module with first automated equipment that is at least one of a) a two aisle automated storage and retrieval system; b) a two pod horizontal carousel; c) a three pod horizontal carousel; and d) a vertical carousel.

In one form, the step of assigning an identification involves scanning a first bar code identification on the first tote indicative of the first order.

In one form, the step of determining whether the first tote is at the first zone involves scanning the first bar code identification on the first tote at the first pick zone.

The method may further include the step of determining at the first zone what item or items are to be placed from the first module into the first tote by scanning the first bar code identification.

The invention is further directed to a warehouse order processing system. The system has a first pick module in a first pick zone with first automated equipment to retrieve and deliver selected items at the first module to a first picking station, and a second pick module in a second pick zone with second automated equipment to retrieve and deliver selected items at the first module to a second picking station. A conveyor directs totes to the first pick zone and from the first pick zone to the second pick zone. An order controller is provided into which an order for items at the first and second modules can be released, as an incident of which the order controller causes a processing command to be directed both to a) the first automated equipment to cause one or more selected items at the first module to be delivered by the first automated equipment to the first picking station; and b) the second automated equipment to cause one or more selected items at the second module to be delivered by the second automated equipment to the second picking station.

The system may further include a first tote having an identification code correlated to a first order released to the order controller and identification equipment provided at the first and second zones to process the identification code and identify an item or items at the first and/or second picking stations to be placed in the first tote.

The identification code may be a readable bar code, with the identification equipment being a bar code reader.

In one form, the order controller causes the processing commands to be directed to the first and second automated equipment to be processed as an entire order on a first-in-first-out basis by the first and second automated equipment.

In one form, the conveyor is operable to cause a plurality of totes to be accumulated at each of the first and second zones.

The system may further include an operator input control which is operable to selectively a) prevent operation of the conveyor and movement of a first tote away from the first zone until all items at the first picking station for the first tote are placed in the first tote; and b) causing the conveyor to operate to advance the first tote from the first zone to the second zone.

In one form, the conveyor includes at least one of a) a belt and b) a plurality of rollers.

In one form, the first automated equipment may be at least one of a) a two aisle automated storage and retrieval system; b) a two pod horizontal carousel; c) a three pod horizontal carousel; and d) a vertical carousel.

DETAILED DESCRIPTION OF THE DRAWINGS

Figure 1:
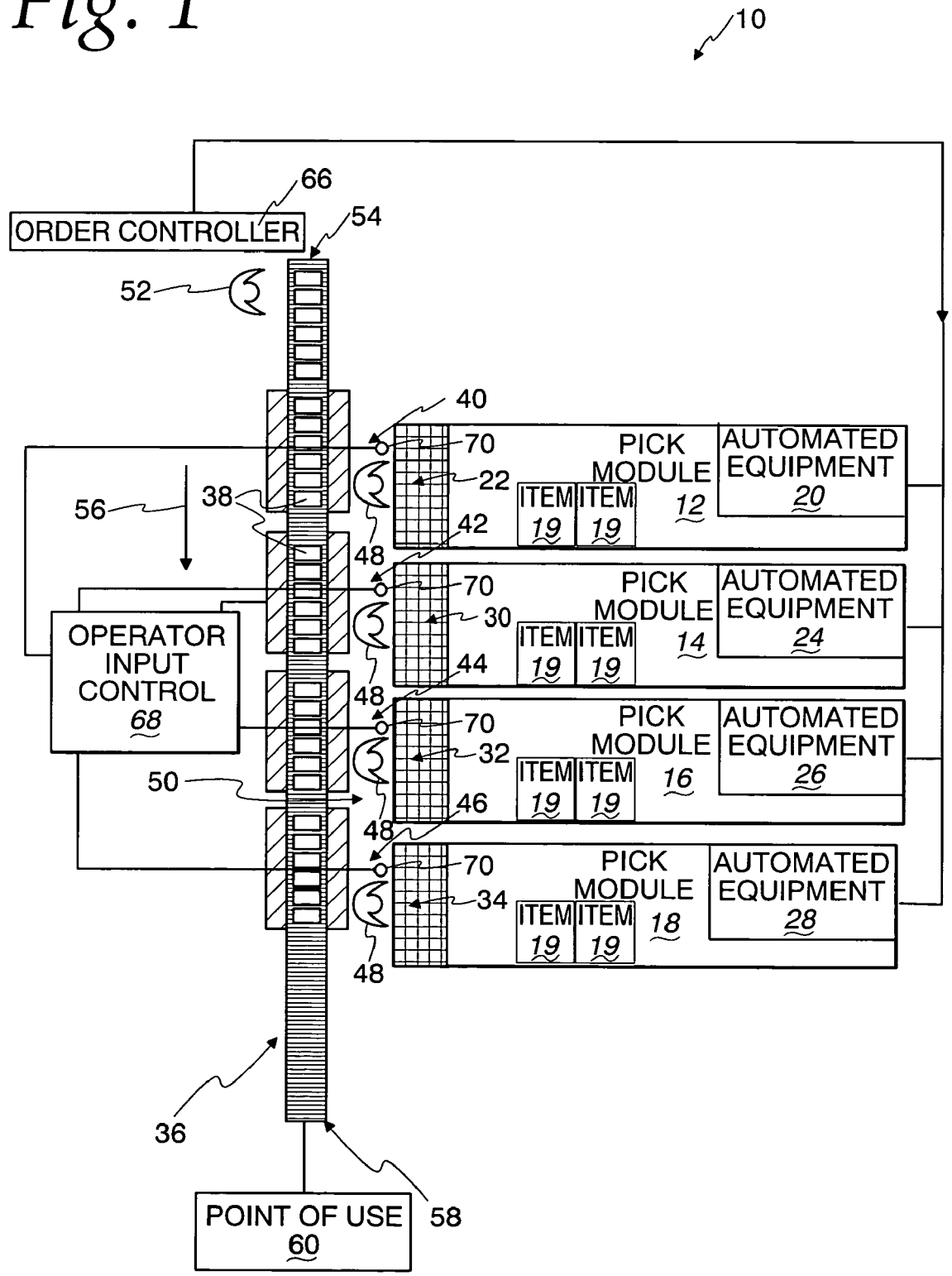
FIG. 1 is a partially schematic, plan representation of a system for processing orders in a warehouse, according to the invention, and including a plurality of pick modules, in which items are stored, in spaced relationship to a conveyor on which totes are strategically moved to facilitate pick to tote operations.

In FIG. 1, a warehouse order processing system, according to the present invention, is shown at 10. The system 10 consists of a plurality of pick modules 12, 14, 16, 18 within which a plurality of replenishable items 19 are placed in a temporary storage position. While four such modules 12, 14, 16, 18 are shown, any number of modules, in excess of one, is contemplated by the invention.

Exemplary pick module 12 includes automated equipment 20 which automatically delivers selected, stored items to a picking station at 22. Automated equipment 24, 26, 28 is incorporated into the pick modules 14, 16, 18, to deliver selected items stored in these modules to associated picking stations 30, 32, 34, consecutively.

A conveyor 36, which may utilize a belt, and more preferably, independently operable rollers, advances containers/totes 38 past the pick modules 12, 14, 16, 18 in spaced relationship therewith. This arrangement defines pick zones 40, 42, 44, 46, at which the pick modules 12, 14, 16, 18, respectively, reside. At least one pick operator 48 is assigned to each pick zone 40, 42, 44, 46, and can maneuver comfortably in a space 50, between each pick module 12, 14, 16, 18 and the conveyor 36, to repeatedly take items from his/her picking station 22, 30, 32, 34 and place the same strategically within the totes 38 on the conveyor 36, as hereinafter explained.

As further explained in greater detail below, an order is assigned to a single tote 38, or may be broken down into sub-orders. A system operator 52, situated at an input end 54 of the conveyor 36, places the totes 38 upon the conveyor 36. The conveyor 36 causes the totes 38 to advance in the direction of the arrow 56 towards an output end 58, from where the totes 38, upon being filled with an entire order/sub-order, are conveyed to a point of use 60, which may be a staging area, or the like.

Figure 2:
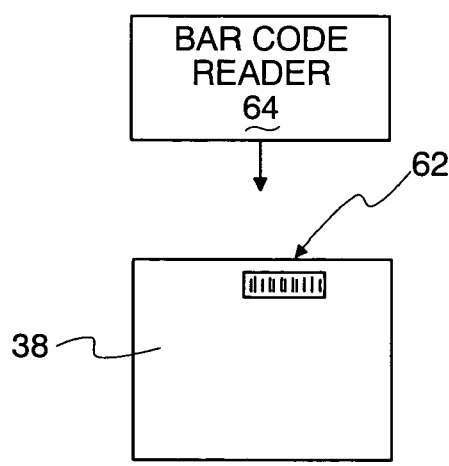
FIG. 2 is a schematic representation of a tote identification system including a bar code identification on the tote and a bar code reader.

The operator 52, or another individual, assigns an identification to each tote(s) 36 correlated to a particular order. As shown in FIG. 2, this identification may be in the form of a bar code identification at 62, which may be scanable by a conventional bar code reader 64 by the operators 48 at the pick zones 40, 42, 44, 46. Of course, a manually readable identification could be put on the totes 36 and function consistently with the invention.

Once the identification is assigned by the operator 52, or other individual, the particular order for items in the pick modules 12, 14, 16, 18 is released by downloading the same to an order controller 66, which generates pick/processing commands to the automated equipment 20, 24, 26, 28 associated with the pick module 12, 14, 16, 18 from which items are to be picked to order. In response to the commands, the automated equipment 20, 24, 26, 28 causes the selected item(s) to be retrieved and delivered to its associated picking station 22, 30, 32, 34 for access by the operator 48 assigned to the particular module 12, 14, 16, 18. By determining the identification of the order from the bar code 62 on the tote 36, or otherwise, the operator 48 is then able to correlate the item with the appropriate order and place the item in the appropriate tote 38.

The totes 38 are allowed to accumulate at each zone 40, 42, 44, 46 so that all operators 48 can be simultaneously filling multiple orders with the conveyor 36 stopped. The movement of the conveyor 36 is coordinated on either a time basis, or by operator input, to be stopped until all of the accumulated totes 38 an all of the active pick zones 40, 42, 44, 46 are filled with all of the items from the pick module 12, 14, 16, 18 in the adjacent zones 40, 42, 44, 46. Alternatively, as shown in FIG. 1, an operator input control 68, operable through an appropriate triggering mechanism 70, provided one each at each pick zone 40, 42, 44, 46, may be operated to halt operation of the conveyor 36 long enough to allow all items to be placed in the totes 38 in the adjacent zone 40, 42, 44, 46. Once the items for all of the orders have been placed in the totes 38, the totes 38 are directed, either one-by-one, or in groups, to the output end 58 of the conveyor 36 for appropriate disposition.

In the embodiment shown in FIG. 1, the conveyor 36 is an in-line conveyor, with the pick modules 12, 14, 16, 18 appropriately positioned to accommodate this configuration. Non-linear arrangements are contemplated for the conveyor 36, which would require a corresponding relocation and a reconfiguration of the pick modules 12, 14, 16, 18.

Figure 3:
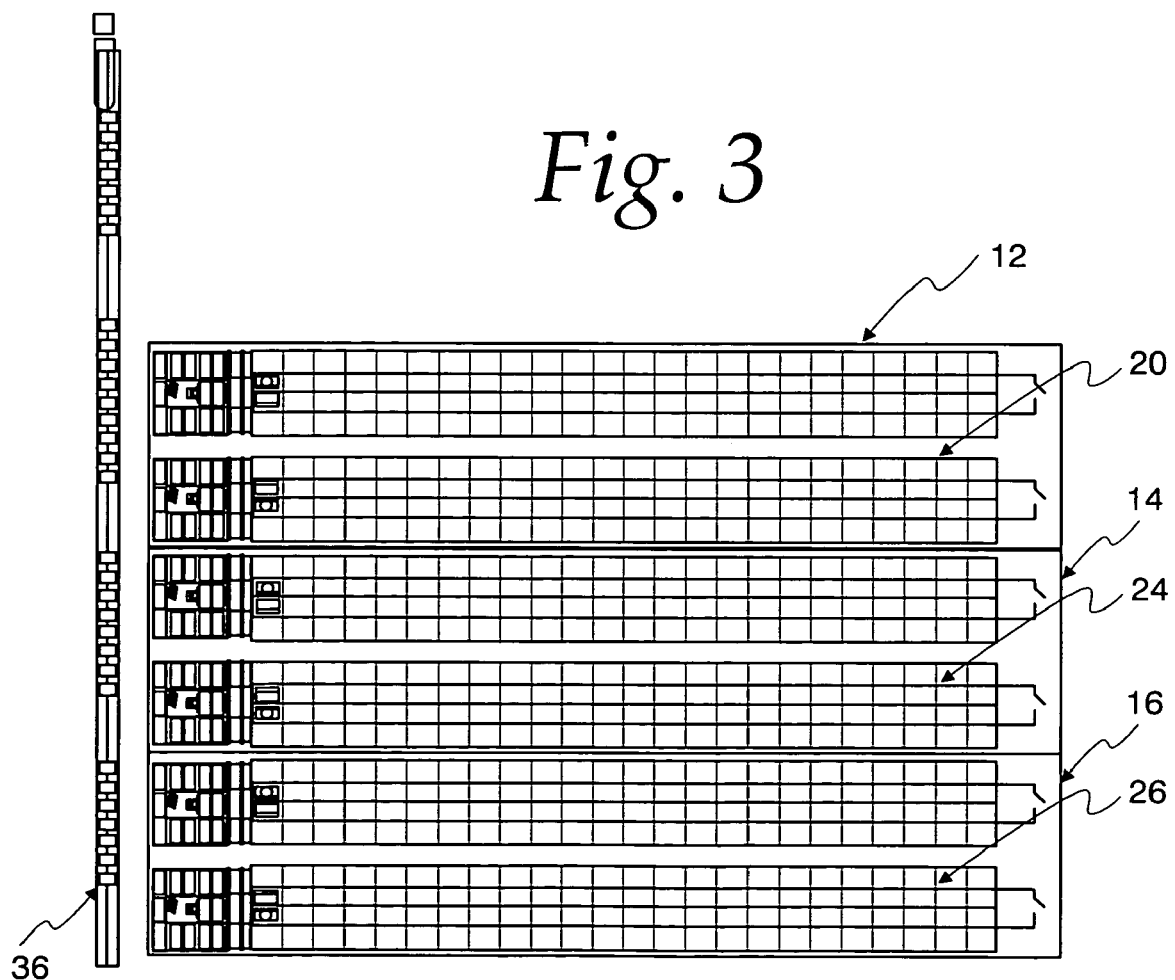
FIG. 3 is a view as in FIG. 1 showing three of the four modules depicted in FIG. 1 and with one form of automated equipment, according to the invention, used on each of the modules to pick items to a picking station associated with each module.

By using the automated equipment 20, 24, 26, 28, the distance to be travelled by the operators 48 can be significantly reduced compared to systems incorporating manual retrieval at the particular modules. Different types of automated equipment are suitable for this purpose. As just examples, as shown in FIG. 3, the automated equipment 20, 24, 26, 28 in each of the four pick modules 12, 14, 16, 18 could be an automated storage and retrieval system, such as that sold commercially by Daifuku as its "Mini Load Automated Storage and Retrieval System", Model No. F200.

Figure 4:
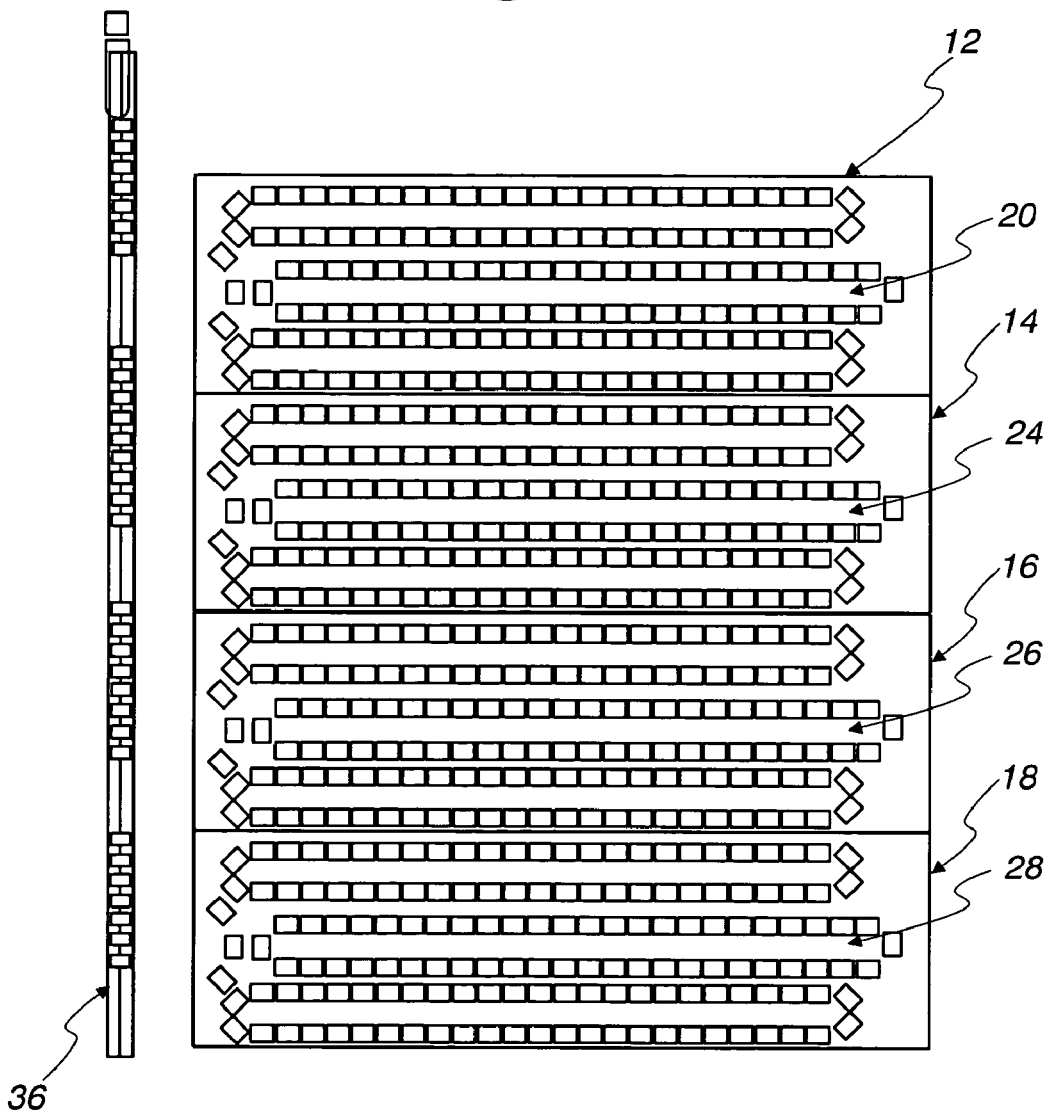
FIG. 4 is a view as in FIG. 3 showing another form of automated equipment.
Figure 5:
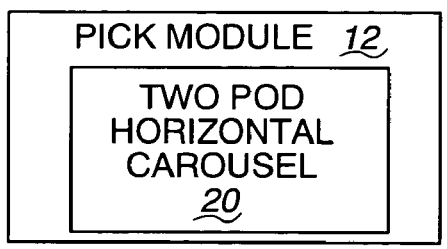
FIG. 5 is a schematic representation of a pick module with another form of automated equipment.
Figure 6:
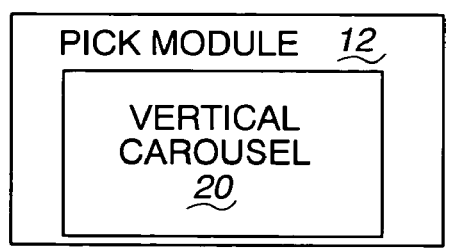
FIG. 6 is a view as in FIG. 5 showing a still further form of automated equipment.

In FIG. 4, the automated equipment 20, 24, 26, 28 is shown as a conventional three pod carousel. As shown schematically in FIG. 5, for exemplary pick module 12, the automated equipment 20 can be a two pod horizontal carousel. Alternatively, as shown schematically in FIG. 6, the automated equipment 20 could be a vertical carousel. It is contemplated that any combination of this automated equipment could be used, or that a combination of automated and manual equipment could be used to accomplish the desired ends. Further, use of virtually any other type of automated retrieval equipment known to those skilled in the art could be used for this purpose.

Figure 7:
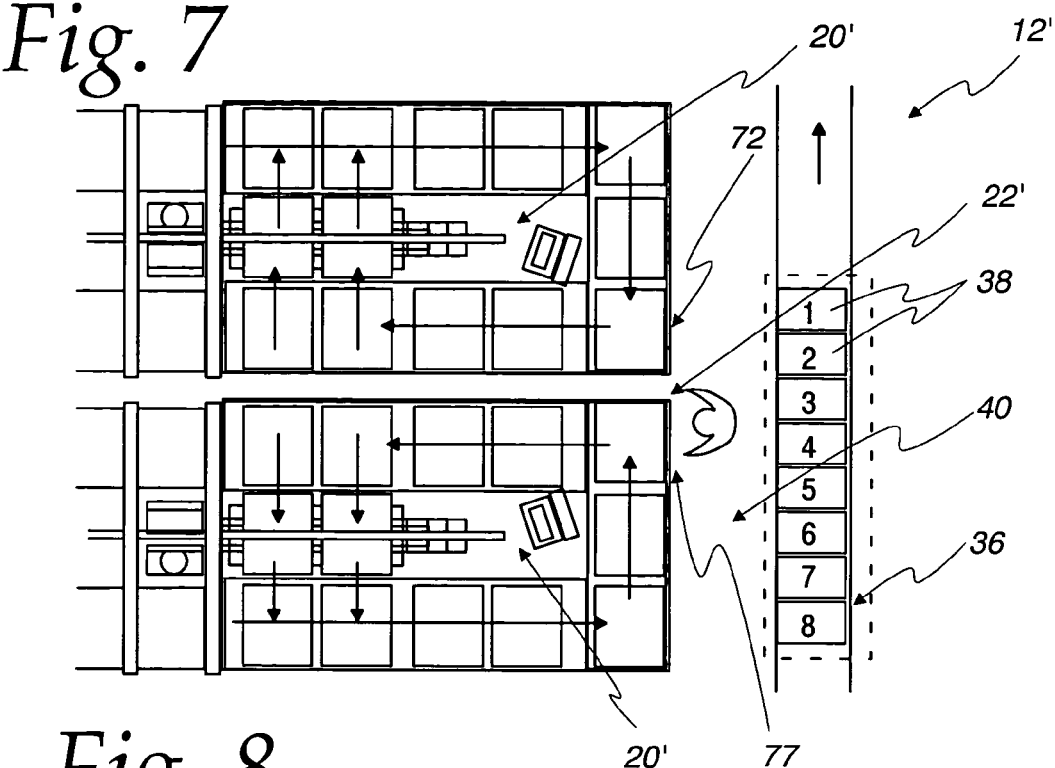
FIG. 7 is an enlarged, fragmentary, plan view of one picking zone having separate, coordinated, automated equipment for picking items to a picking station at one pick zone.

It is also contemplated that a module could incorporate more than one piece of automated equipment. For example, as shown in FIG. 7, a pick module at 12', corresponding to the pick module 12, consists of two similarly constructed and functioning automated storage and retrieval systems 20', which define two different picking locations 72, 74 at the picking station 22', corresponding to the picking station 22. If multiple pieces of automated equipment 20 are utilized at a single zone, the individual pieces of equipment may get out of sync. That is, the oldest pick available for the operator to process may not be for the tote in the first picked spot. The operator will always process the oldest pick available from within the pick module and place it in the corresponding tote within that zone. The operator is capable of picking to any of the totes within his/her zone.

Figure 8:
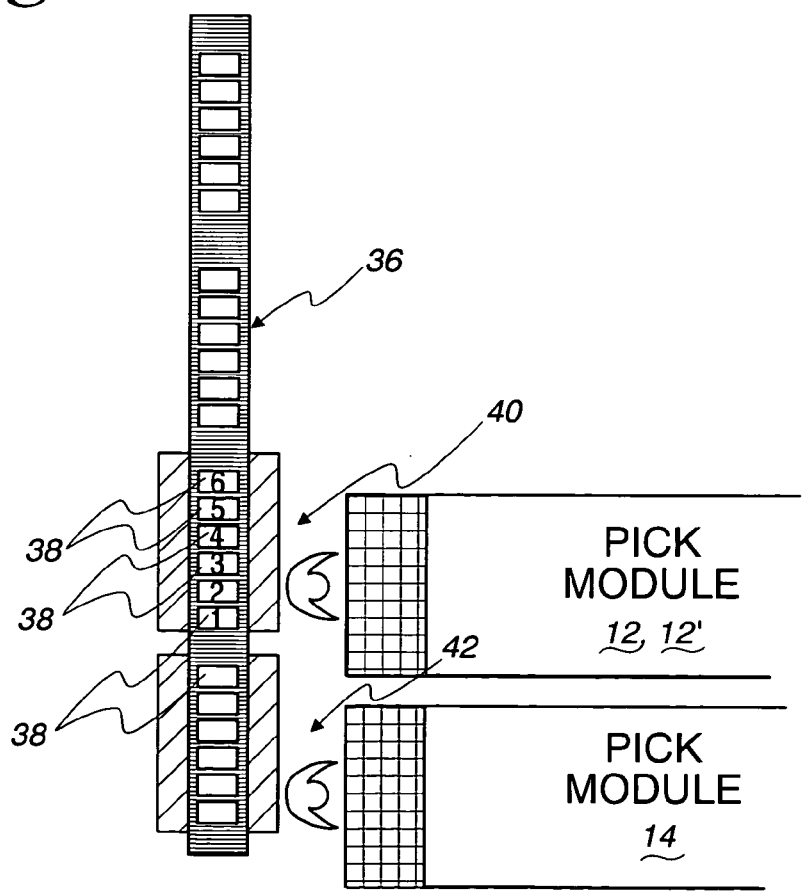
FIG. 8 is an enlarged, fragmentary, plan view of a conveyor in relation to two different pick modules.

As seen also in FIG. 8, taken in conjunction with FIG. 7, in each picking zone 40, 42, a plurality of totes 38 is allowed to accumulate. The totes 38 are shown accumulated to six in number in each of the zones 40, 42 in FIG. 8, and to eight in number in the pick zone 40, as shown in FIG. 7.

Figure 9:
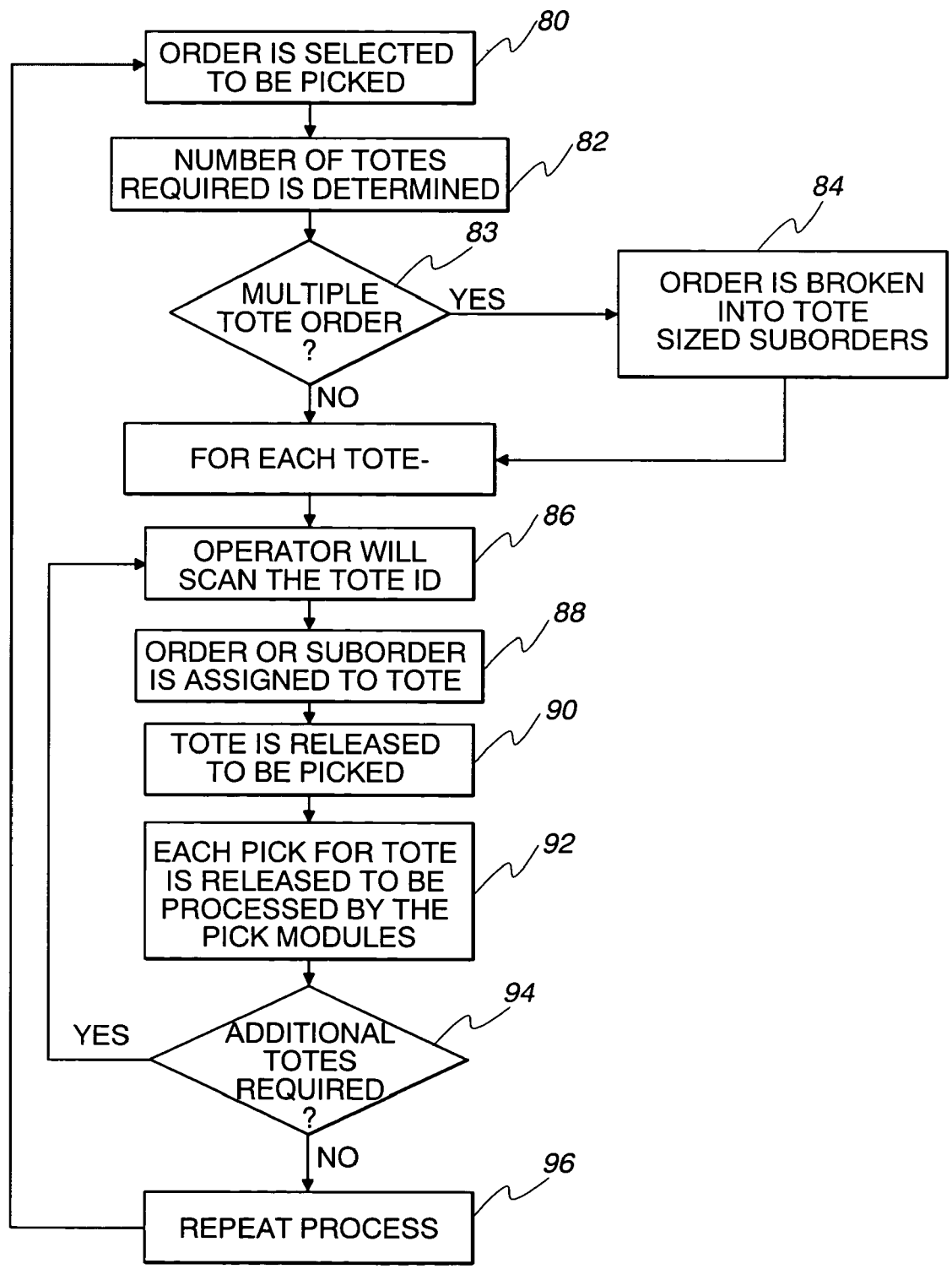
FIG. 9 is a flow diagram showing the order release process, according to the present invention.

A more specific description of the operation of the system 10 will now be described with respect to the flow diagrams in FIGS. 9–11. Referring initially to FIG. 9, the order release process is shown. In block 80, the operator 52 selects an order to be filled. As indicated in block 82, the selected order is analyzed to determine the number of totes required to hold all items. If multiple totes 38 are required, i.e. the response to the query in block 83 is YES, as shown in block 84, the order is split into one or more sub-orders. Each order or sub-order consists of one tote with specific pick items. For this process, an "order" will refer to one tote worth of picks. An assigned identification for each tote 38 is scanned by the operator 52 to correlate the order to a particular tote, as shown at blocks 86 and 88. Each order/sub-order is thus "assigned" to a specific tote 38.

The operator 52 then places a tote 38 on the conveyor 36. The operator will then scan the bar code identifier 62 to assign that order or sub-order to the particular tote 38. Once the order or sub-order is assigned to the tote, the tote is released by being downloaded for processing at the modules 12, 14, 16, 18, as indicated at block 90, thereby causing a command signal to be directed to the pick modules 12, 14, 16, 18, to be processed by the automated equipment 20, 24, 26, 28 thereat, to thereby cause one or more selected items at the modules 12, 14, 16, 18 to be delivered from a pick from location to the picking stations 22, 30, 32, 34.

The automated equipment 20, 24, 26, 28 simultaneously begins processing in response to the commands immediately upon the order being downloaded. The automated equipment 20, 24, 26, 28 processes the picks in the sequence that they are received, i.e. first-in-first-out. Once an order is released, it must pass through all the pick zones before the order is completed. The need for additional totes is determined at block 94. If the query response at block 94 is YES, the steps in blocks 86–94 are repeated. If the query response is NO, as indicated in block 96, the order processing is repeated from the step in block 80.

Figure 10:
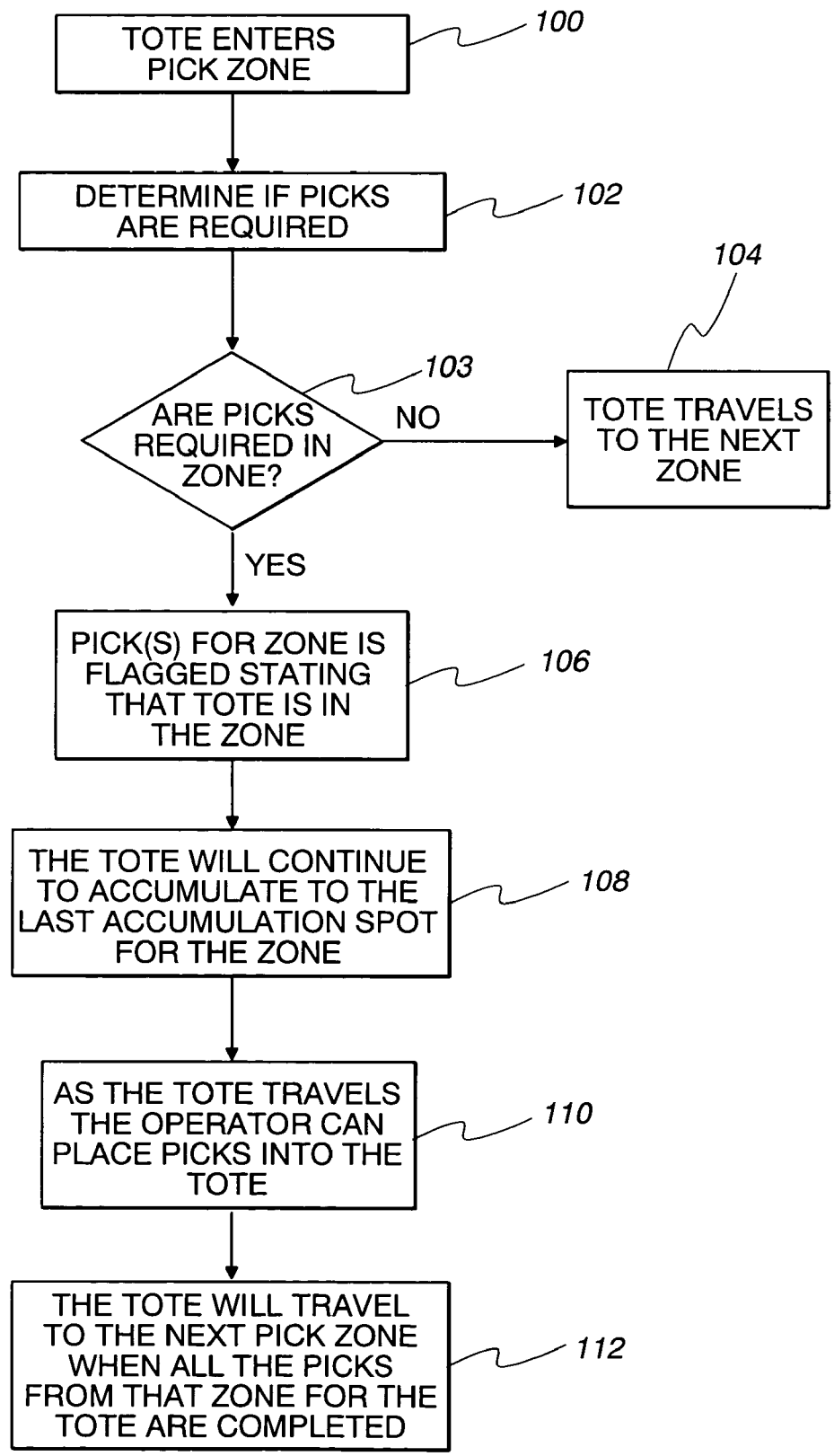
FIG. 10 is a flow diagram showing the tote picking process, according to the present invention.

The tote picking process is shown in flow diagram form in FIG. 10. Once the tote 38 has been conveyed to the first pick zone 40, as indicated at block 100, the bar code 62 is read/identified, whereby the software in the order controller 66 determines if this particular tote 38 has picks required in this zone 40, as indicated at block 102. If no picks are required in a particular zone, the answer to the query in block 103 is NO, and the tote travels to the next zone, as indicated at block 104. If the answer to the query in block 103 is YES, the picks for each zone are flagged for the tote in the particular zone, as indicated at block 106.

Typically, when the tote 38 enters a zone, the picks required at the picking station 22, 30, 32, 34, are ready to be placed in the appropriate tote 38. The tote is conveyed to the last accumulation spot at a particular zone, as shown at block 108, at which location the picked items are placed in the appropriate tote, as shown at block 110. As the operator processes the picks, the tote 38 will continue to accumulate forward until it reaches the last accumulation spot for that zone, beginning at 1 in FIGS. 1, 7 and 8, and continuing to an accumulation of six (FIG. 1–8) or eight (FIG. 7).

The operator will always process the oldest pick available at the pick module. If the operator has not finished picking all the lines for a tote before it reaches the last accumulation spot, the tote will delay until all the picks are completed for that zone. This delay may be effected through the operator input control 68, in FIG. 1. At the completion of the pick to tote operation for all accumulated totes at each zone, the totes are converged at the next zone, as indicated at block 1 12. As noted previously, once all items at a particular zone are placed in the leading tote at a particular zone, the operator thereat can, through the operator input control, either a) cause the conveyor to advance that individual tote by manually inputting a run signal to the conveyor, or b) provide an input to the system that all items have been placed in the tote, which input will be processed by the order controller 66, whereby the tote will be automatically advanced to the next zone or point of use 60. This input may be made as on a touch screen on the operator input control 68. This is because each pick module starts to pick the line as soon as the order is downloaded. The operator cannot pick the items from the pick module picking station to place it in the tote 38 until the tote is in the appropriate zone.

Figure 11:
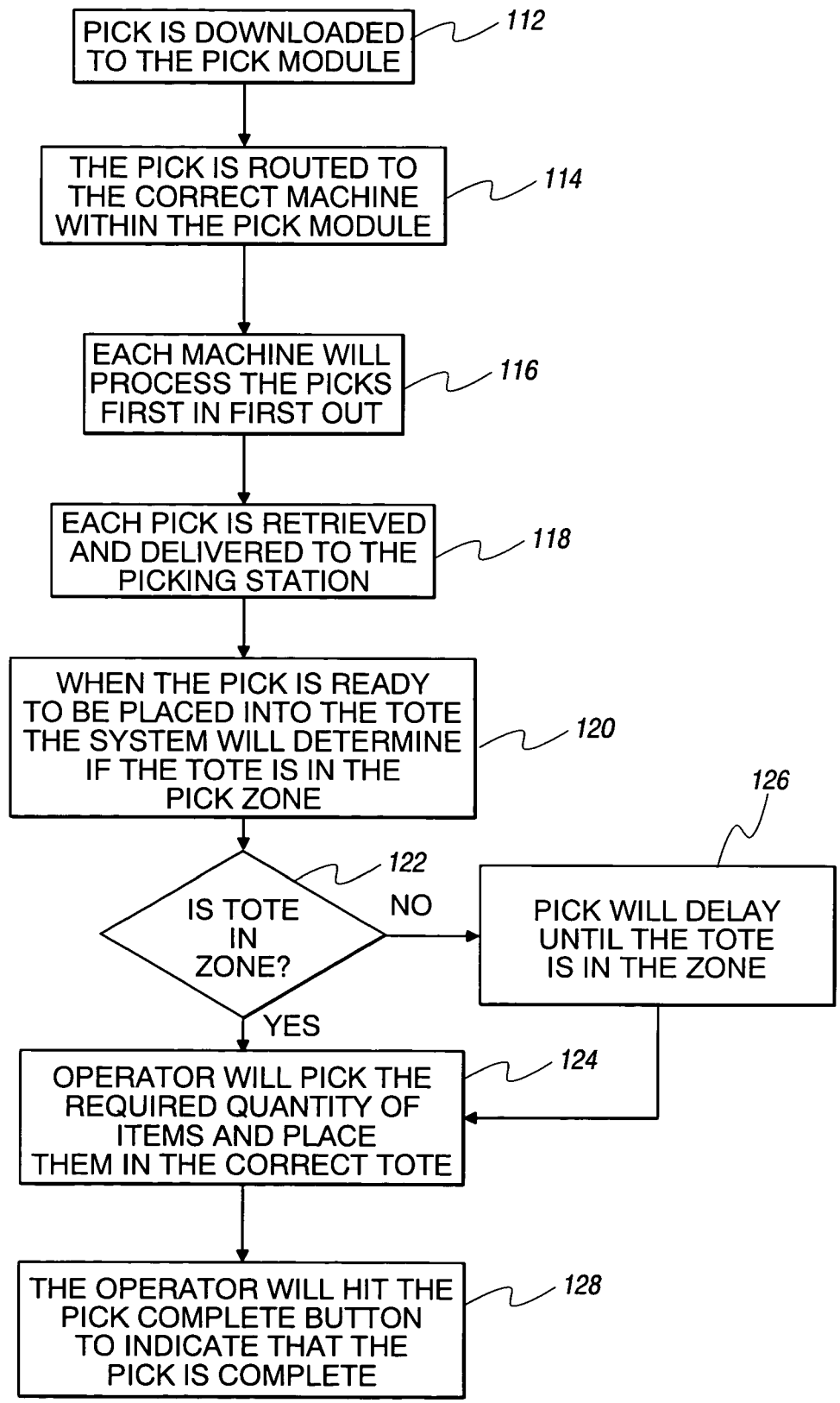
FIG. 11 is a flow diagram showing the operator pick process, according to the present invention.

The operator pick process steps are shown in flow diagram form in FIG. 11. In block 112, the pick order is downloaded to each of the pick modules 12, 14, 16, 18. The pick command is given to the appropriate automated equipment 20, 24, 26, 28 at the particular pick module 12, 14, 16, 18 at which items are to be picked, as shown at block 114.

The picks are made by the automated equipment 20, 24, 26 28, on a first-in-first-out basis, as shown at block 116.

Each picked item is retrieved by the automated equipment 20, 24, 26, 28 and delivered to the appropriate picking station 22, 30, 32, 34, as indicated at block 118. With the picked items at the picking station 22, 30, 32, 34, it is determined whether the appropriate tote is at the adjacent pick zone, as indicated at block 120. If it is determined that the tote is in the zone, the answer to the query in block 122 is YES, and the operator will pick the required quantity of items and place them in the correct tote in the accumulated totes at his/her zone, as indicated at block 124. If the answer to the query in block 122 is NO, the pick to tote will be delayed until the tote is in the zone, as indicated at block 126.

Once the operator has placed the required quantity of items in the tote at his/her zone, the operator will operate a "hit complete" actuator, as on the operator input control 68, as indicated at block 128. Once the picks to all accumulated totes have been completed and the operators have so indicated, the totes can be conveyed to the next zone.

The foregoing disclosure of specific embodiments is intended to be illustrative of the broad concepts comprehended by the invention.

The invention claimed is:

1. A method of processing orders in a warehouse, the method comprising the steps of:

providing a first pick module in a first pick zone with a first plurality of stored items and a first picking station;

providing a second pick module in a second pick zone with a second plurality of stored items and a second picking station;

releasing a first order including at least one item from each of the first and second pick modules and thereby causing a) the at least one item in the first pick module to be retrieved and delivered to the first picking station and b) the at least one item in the second pick module to be retrieved and delivered to the second picking station;

directing first and second totes simultaneously and serially to the first and second pick zones;

determining whether the first tote is at the first pick zone and, upon determining that the first tote is at the first pick zone, picking the at least one item from the first picking station and placing the at least one item from the first picking station in the first tote;

determining whether the first tote is at the second pick zone and, upon determining that the first tote is at the second pick zone, picking the at least one item from the second picking station and placing the at least one item from the second picking station in the first tote;

releasing a second order including at least a third item from one of the first and second pick modules and thereby causing the third item from the one of the first and second pick modules to be retrieved and delivered to the picking station associated with the one of the first and second pick modules; and determining whether the second tote is at the pick zone associated with the one of the first and second pick modules and, upon determining that the second tote is at the pick zone associated with the one of the first and second pick modules, picking the third item from the picking station associated with the one of the first and second pick modules and placing the third item from the picking station associated with the one of the first and second pick modules in the second tote, wherein the step of releasing a first order comprises downloading an order for processing at each of the first and second pick modules, wherein the step of providing a first pick module comprises providing a first pick module with first automated equipment comprising a first carousel, the first automated equipment receiving a first processing command in response to the downloading of the first order, and the step of causing the at least one item in the first pick module to be retrieved and delivered to the first picking station comprises causing the first carousel to retrieve and deliver the at least one item in the first pick module to the first picking station as an incident of receiving the first processing command.

2. The method of processing orders in a warehouse according to claim 1 wherein the step of releasing a second order comprises downloading the second order for processing at the first pick module and thereby causing the first automated equipment to receive a second processing command and, as an incident thereof, to retrieve and deliver the third item in the first pick module to the first picking station, wherein the first automated equipment delivers the at least one item and the third item from the first pick module to the first picking station on a first-in-first-out basis.

3. The method of processing orders in a warehouse according to claim 1 wherein the step of providing a second pick module comprises providing a second pick module with second automated equipment that receives a second processing command in response to the downloaded order and the step of causing the at least one item in the second pick module to be retrieved and delivered to the second picking station comprises causing the second automated equipment to retrieve and deliver the at least one item in the second pick module to the second picking station as an incident of receiving the second processing command.

4. The method of processing orders in a warehouse according to claim 1 wherein the step of directing the first tote to the first and second pick zones comprises directing the first tote on a conveyor, comprising at least one of a) a belt, and b) a plurality of rollers, to the first and second pick zones.

5. The method of processing orders in a warehouse according to claim 1 wherein the step of directing the first tote to the first and second pick zones comprises directing the first tote from the first pick zone to the second pick zone after the at least one item from the first pick zone is placed in the first tote.

6. The method of processing orders in a warehouse according to claim 1 further comprising the step of assigning a separate operator to each of the first and second zones to manually place the at least one item at the first picking station in the first tote with the first tote at the first pick zone and the at least one item at the second picking station in the first tote with the first tote at the second pick zone.

7. The method of processing orders in a warehouse according to claim 1 wherein the step of providing a first module with first automated equipment comprises providing a first module with first automated equipment that is at least one of: a) a two aisle automated storage and retrieval system; b) a two pod horizontal
carousel; c) a three pod horizontal carousel; and d) a vertical carousel.

8. The method of processing orders in a warehouse according to claim 1 wherein the step of providing a second pick module comprises providing a second pick module with second automated equipment which is capable of retrieving at least one item in the second pick module.

9. The method of processing orders in a warehouse according to claim 6 wherein the step of providing a second pick module with second automated equipment comprises providing a second pick module with second automated equipment comprising a second carousel.

10. The method of processing orders in a warehouse according to claim 1 wherein the steps of picking the at least one item from the first picking station and placing the at least one item from the first picking station in the first tote comprises manually picking the at least one item from the first picking station and placing the at least one item from the first picking station in the first tote.

11. A method of processing orders in a warehouse, the method comprising the steps of:
providing a first pick module in a first pick zone with a first plurality of stored items and a first picking station;
providing a second pick module in a second pick zone with a second plurality of stored items and a second picking station;
releasing a first order including at least one item from each of the first and second pick modules and thereby causing a) the at least one item in the first pick module to be retrieved and delivered to the first picking station and b) the at least one item in the second pick module to be retrieved and delivered to the second picking station;
directing a first tote serially to the first and second pick zones;
determining whether the first tote is at the first pick zone and, upon determining that the first tote is at the first pick zone, picking the at least one item from the first picking station and placing the at least one item from the first picking station in the first tote; and
determining whether the first tote is at the second pick zone and, upon determining that the first tote is at the second pick zone, picking the at least one item from the second picking station and placing the at least one item from the second picking station in the first tote,
wherein the step of releasing an order comprises downloading an order for processing at each of the first and second pick modules,
wherein the step of providing a first pick module comprises providing a first pick module with first automated equipment that receives a first processing command in response to the downloading of the first order,
wherein the step of causing the at least one item in the first pick module to be retrieved and delivered to the first picking station comprises causing the first automated equipment to retrieve and deliver the at least one item in the first pick module to the first picking station as an incident of receiving the first processing command;
releasing a second order including at least another item from the first pick module by downloading the second order for processing at the first pick module and thereby causing the first automated equipment to receive a second processing command and, as an incident thereof, to retrieve and deliver the at least another item in the first pick module to the first picking station
directing a second tote to the first pick zone;
determining whether the second tote is at the first pick zone; and
upon determining that the second tote is at the second pick zone, picking the at least another item from the first picking station and placing the at least another item from the first picking station in the second tote,
wherein the steps of directing the first and second totes to the first pick zone comprise causing the first and second totes to simultaneously reside at the first pick zone and the steps of placing the at least one item in the first tote and the at least another item in the second tote comprise placing the at least one item and the at least another item in the respective totes in the sequence in which the at least one item and the at least another item are delivered to the first picking station.

12. The method of processing orders in a warehouse according to claim 11 wherein the first automated equipment delivers the at least one item and the at least another item from the first pick module to the first picking station on a first-in-first-out basis.

13. A method of processing orders in a warehouse, the method comprising the steps of:

providing a first pick module in a first pick zone with a first plurality of stored items and a first picking station;

providing a second pick module in a second pick zone with a second plurality of stored items and a second picking station;

releasing a first order including at least one item from each of the first and second pick modules and thereby causing a) the at least one item in the first pick module to be retrieved and delivered to the first picking station and b) the at least one item in the second pick module to be retrieved and delivered to the second picking station;

directing a first tote serially to the first and second pick zones;

determining whether the first tote is at the first pick zone and, upon determining that the first tote is at the first pick zone, picking the at least one item from the first picking station and placing the at least one item from the first picking station in the first tote;

determining whether the first tote is at the second pick zone and, upon determining that the first tote is at the second pick zone, picking the at least one item from the second picking station and placing the at least one item from the second picking station in the first tote, wherein the step of releasing an order comprises downloading an order for processing at each of the first and second pick modules, wherein the step of providing a first pick module comprises providing a first pick module with first automated equipment that receives a first processing command in response to the downloading of the first order, wherein the step of causing the at least one item in the first pick module to be retrieved and delivered to the first picking station comprises causing the first automated equipment to retrieve and deliver the at least one item in the first pick module to the first picking station as an incident of receiving the first processing command;

releasing a second order including at least another item from the first pick module by downloading the second order for processing at the first pick module and thereby causing the first automated equipment to receive a second processing command and, as an incident thereof, to retrieve and deliver the at least another item in the first pick module to the first picking station directing a second tote to the first pick zone;

determining whether the second tote is at the first pick zone; and upon determining that the second tote is at the second pick zone, picking the at least another item from the first picking station and placing the at least another item from the first picking station in the second tote, said method further comprising the step of directing the first tote and the second tote from the first zone to the second zone after the at least one item from the first pick zone is placed in the first tote and after the at least another item from the first zone is placed in the second tote.

14. The method of processing orders in a warehouse according to claim 13 wherein the first automated equipment delivers the at least one item and the at least another item from the first pick module to the first picking station on a first-in-first-out basis.

15. A method of processing orders in a warehouse, the method comprising the steps of:

providing a first pick module in a first pick zone with a first plurality of stored items and a first picking station;

providing a second pick module in a second pick zone with a second plurality of stored items and a second picking station;

releasing a first order including at least one item from each of the first and second pick modules and thereby causing a) the at least one item in the first pick module to be retrieved and delivered to the first picking station and b) the at least one item in the second pick module to be retrieved and delivered to the second picking station;

directing first and second totes simultaneously and serially to the first and second pick zones;

determining whether the first tote is at the first pick zone and, upon determining that the first tote is at the first pick zone, manually picking the at least one item from the first picking station and placing the at least one item from the first picking station in the first tote;

releasing a second order including at least a third item from one of the first and second pick modules and thereby causing the third item from the one of the first and second pick modules to be retrieved and delivered to the picking station associated with the one of the first and second pick modules;

determining whether the second tote is at the pick zone associated with the one of the first and second pick modules and, upon determining that the second tote is at the pick zone associated with the one of the first and second pick modules, manually picking the third item from the picking station associated with the one of the first and second pick modules and placing the third item from the picking station associated with the one of the first and second pick modules in the second tote; and determining whether the first tote is at the second pick zone and, upon determining that the first tote is at the second pick zone, manually picking the at least one item from the second picking station and placing the at least one item from the second .picking station in the first tote.

16. The method of processing orders in a warehouse according to claim 15 further comprising the step of assigning an identification to each tote in the first order before releasing the first order.

17. The method of processing orders in a warehouse according to claim 16 wherein the step of assigning an identification comprises assigning a first bar code identification to the first tote indicative of the first order.

18. The method of processing orders in a warehouse according to claim 17 wherein the step of determining whether the first tote is at the first zone comprises scanning the first bar code identification on the first tote at the first pick zone.

19. The method of processing orders in a warehouse according to claim 18 further comprising the step of determining at the first zone what item or items are to be placed from the first module into the first tote by scanning the first bar code identification.

20. A method of processing orders in a warehouse, the method comprising the steps of:
   a) providing a first pick module in a first pick zone with a first plurality of stored items and a first picking station;
   b) providing a second pick module in a second pick zone with a second plurality of stored items and a second picking station;
   c) releasing a first order including at least one item from each of the first and second pick modules and thereby causing i) the at least one item in the first pick module to be retrieved and delivered to the first picking station and ii) the at least one item in the second pick module to be retrieved and delivered to the second picking station;
   d) directing a first tote serially to the first and second pick zones;
   e) determining whether the first tote is at the first pick zone and, upon determining that the first tote is at the first pick zone, picking the at least one item from the first picking station and placing the at least one item from the first picking station in the first tote;
   f) determining whether the first tote is at the second pick zone and, upon determining that the first tote is at the second pick zone, picking the at least one item from the second picking station and placing the at least one item from the second picking station in the first tote;

determining if more than one tote is required for the first order before releasing the first order; and if more than one tote is required for the first order, breaking the first order into sub-orders that are each processed by carrying out steps a)–f).

* * * * *